(12) United States Patent
Utaki et al.

(10) Patent No.: US 7,513,097 B2
(45) Date of Patent: Apr. 7, 2009

(54) CABLE PROTECTION AND GUIDE DEVICE

(75) Inventors: Akihiko Utaki, Osaka (JP); Masaaki Ikeda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/946,131

(22) Filed: Nov. 28, 2007

(65) Prior Publication Data

US 2008/0184693 A1 Aug. 7, 2008

(30) Foreign Application Priority Data

Feb. 7, 2007 (JP) .............................. 2007-027921

(51) Int. Cl.
*F16G 13/00* (2006.01)
(52) U.S. Cl. .............................. 59/78.1; 59/900; 248/49
(58) Field of Classification Search ................... 59/78.1, 59/900; 248/49, 51
See application file for complete search history.

(56) References Cited

U.S. PATENT DOCUMENTS 5,836,148 A * 11/1998 Fukao ......................... 59/78.1
7,310,937 B2 * 12/2007 Kim ........................... 59/78.1
7,392,650 B2 * 7/2008 Utaki et al. .................. 59/78.1

FOREIGN PATENT DOCUMENTS

JP 2006-250258 9/2006

* cited by examiner

*Primary Examiner*—David B Jones
(74) *Attorney, Agent, or Firm*—Woodling, Krost and Rust (57) ABSTRACT

A cable protection and guide device having a connected link module enables quick assembly and reduces the number or parts and parts management necessary to form the cable The cable protection and guide device includes a plurality of side plate portions formed by connected link modules each integrally molded with coupling portions. Stopper links each incorporated with the coupling portions on the cable accommodating space side by a snap-fit mechanism limit the flexional angles of motion. Connecting arms interengage the stopper links on the outer and inner flexion inner circumferential sides.

6 Claims, 11 Drawing Sheets

CABLE PROTECTION AND GUIDE DEVICE

This application claims priority to Japanese Patent Application 2007-027921 filed Feb. 7, 2007.

TECHNICAL FIELD

The present invention relates to a cable or the like protection and guide device suitable for accommodating a cable or the like such as a cable(s), a hose (s) or the like. The cable(s), a hose (s) or the like supply a movable portion of an industrial machine with energy such as electric power or compressed air or the like.

BACKGROUND TECHNOLOGY

Figure 11:
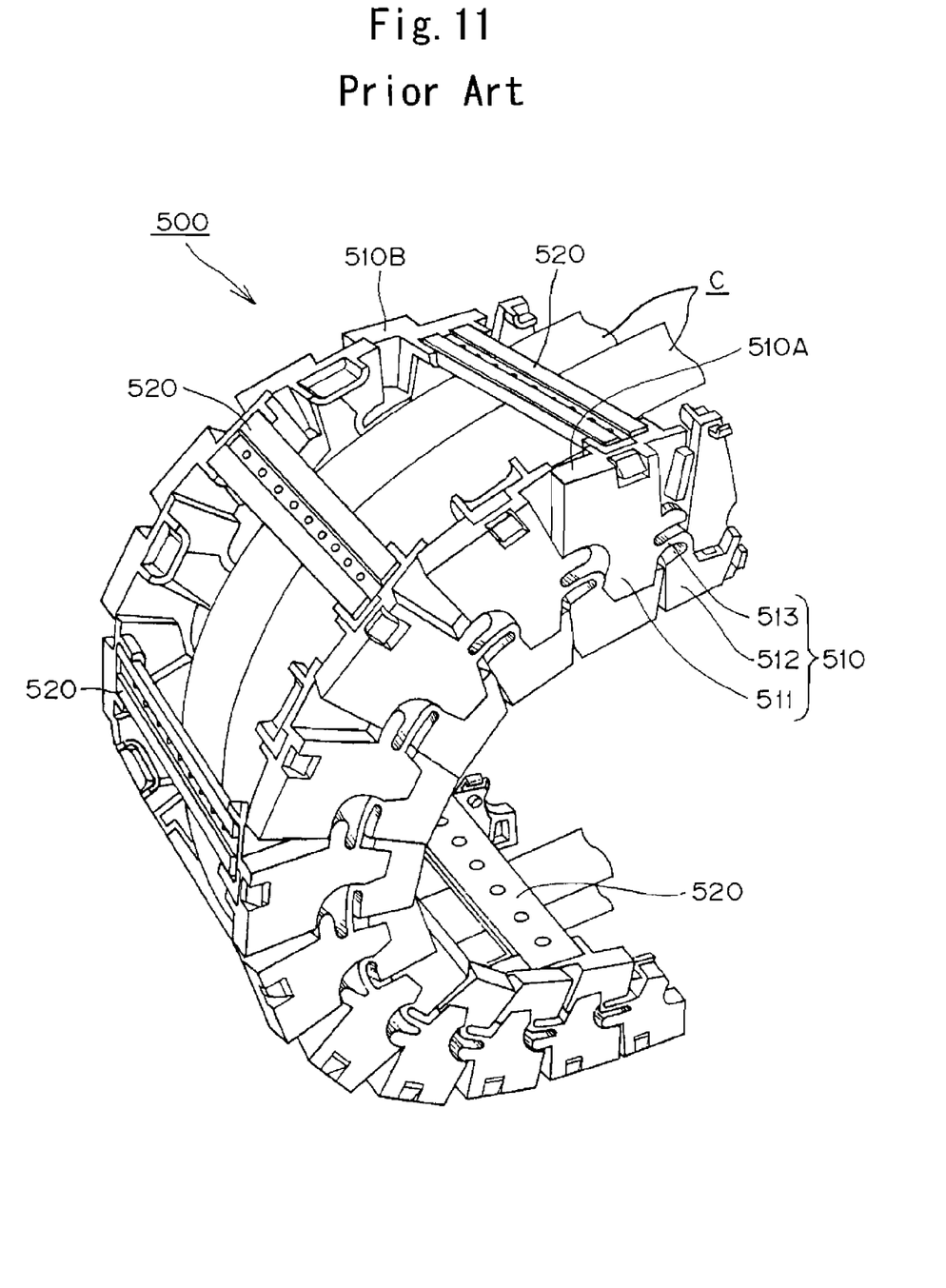
FIG. 11 is a perspective view showing a part of a conventional cable or the like protection and guide device 500.

A conventional cable or the like protection and guide device is shown in FIG. 11. FIG. 1 illustrates a cable or the like protection and guide device configured such that a number of spaced pairs of right and left side plates 510A and 510B are connected to each other from a mounting fixed end toward a mounting movable end. In a longitudinal direction of the device, connecting arms 520 are respectively bridged over a flexional inner circumferential side and a flexional outer circumferential side of these side plates 510A and 510B in an alternating arrangement interval such that the arms 520 are bridged over every other one of the connected side plates 510A and 510B. A cable or the like is accommodated in a rectangular sectional cable accommodating space surrounded by these pairs of right and left side plates 510A and 510B and the connecting arms 520 are respectively disposed on the flexional inner circumferential side and the flexional outer circumferential side in a bridged manner along the longitudinal direction of the device.

In such a conventional cable or the like protection and guide device 500, side plates 510A and 510B are each integrally formed of a front side plate portion 511 connected to the preceding side plate portions 510A and 510B, a rear side plate portion 512 connected to the subsequent side plate portions 510A and 510B and a flexible coupling 513 interconnecting the front side plate portion 511 and the subsequent side plate portion 512. A snap-fit mechanism joins adjacent side plates 510A and 510B to each other. The snap-fit mechanism is provided between the rear side plate portion 512 of the preceding side plate and the front side plate portion 511 of the side plate subsequently connected to the rear side plate portion 512.

Adjacent side plates 510A, 510B are removable from each other through these snap-fit mechanisms so that maintenance during coupling and decoupling of the side plates 510A (510B) can be easily attained as set forth in Patent Reference 1, Japanese Laid-Open Patent Publication No. 2006-250258.

Problems to be Solved by the Invention

In the above-mentioned conventional cable or the like protection and guide device 500, since the side plates 510A, 510B include three parts, namely, a front side plate portion 511, a rear side plate portion 512 and a coupling 513, the shapes of the side plates 510A and 510B become complicated and the number of parts increases. Further, the respective side plates 510A and 510B are independent separate parts and their connection in a long cable protection and guide device requires considerable assembly. Further, since a pair of spaced right and left side plate portions 510A, 510B are mirror images of each other, the right and left side plate portions 510A and 510B are not interchangeable and the right and left side plate portions 510A and 510B must be managed separately which increases management of parts. And since large tensile forces are generated in the coupling 513 during operations the longevity of the side is plates is questionable.

Thus, an object of the present invention is to provide a cable or the like protection and guide device which is durable. Further, it is an object of the invention to manufacture and assemble parts easily.

SUMMARY OF THE INVENTION

Means for Solving the Problems

The invention solves the above-described problems. A cable or the like protection and guide device is provided in which a number of pairs of spaced right and left side plate portions are connected to each other and extend from a mounting fixed end to a mounting movable end. Connecting arms are respectively bridged over a flexional inner circumferential side and a flexional outer circumferential side of the side plate portions at predetermined intervals. A cable or the like is accommodated in a cable accommodating space surrounded by the side plate portions and the connecting arms from the mounting fixed end toward the mounting movable end. A plurality of side plate portions form a connected link module integrally molded with a plurality of coupling portions. The cable or the like protection and guide device includes stopper links incorporated in the coupling portions of the connected link module. The stopper links reside on the cable accommodating space side and are connected to the connected link module with a snap-fit mechanism. The connecting arms are incorporated in the stopper links.

The invention further solves the above-described problems wherein the side plate portion is symmetrically shaped with respect to the vertical center line.

The invention further solves the above-described problems wherein the stopper link is symmetrically shaped with respect to the vertical center line.

Effects of the Invention

The invention is a cable or the like protection and guide device in which a number of pairs of spaced right and left side plate portions are connected to each other from a mounting fixed end to a mounting movable end and connecting arms are respectively bridged over a flexional inner circumferential side and a flexional outer circumferential side of said side plate portions at predetermined intervals. A cable or the like is accommodated in a cable accommodating space surrounded by side plate portions and the connecting arms from the mounting fixed end toward the mounting movable end. The plurality of side plate portions form a connected link module integrally molded through coupling portions. The cable or the like protection and guide device includes stopper links each incorporated to the coupling portion of the connected link module from the cable accommodating space side by a snap-fit mechanism. The connecting arm is incorporated to the stopper link. The plurality of side plate portions are integrally molded and thus there are fewer parts used to make the cable protection and guide devices. Manufacturing of the parts is reduced and assembly of the parts is simplified. Further, since the connected link module is supported by a stopper link, tensile force applied to the coupling arm is dispersed, and as the result the generation of large tensile forces in the coupling arm is suppressed and the durability is of the cable protection and guide device is improved.

Additionally, the stopper link has a symmetrical shape with respect to the vertical center line. The stopper links each have the same shape and can be interchanged and used on the right or left side of the device. Thus parts management is simplified.

The drawings will be best understood when reference is made to the DESCRIPTION OF THE INVENTION and CLAIMS which follow hereinbelow.

DESCRIPTION OF THE INVENTION

If manufacturing of the parts which comprise the cable guide and protection device is simplified and the assembly of the cable guide and protection device is simplified a useful cost efficient device is produced. Further, the endurance of the device is enhanced. The cable or the like protection and guide device includes a number of pairs of spaced right and left side plate portions integrally connected to each other from a mounting fixed end to a mounting movable end. Connecting arms are respectively bridged over a flexional inner circumferential side and a flexional outer circumferential side of the side plate portions at predetermined intervals. A cable or the like is accommodated in a cable accommodating space surrounded by the side plate portions and the connecting arms from the mounting fixed end toward the mounting movable end. The plurality of side plate portions form a connected link module integrally molded through coupling portions. The cable or the like protection and guide device has stopper links each incorporated to the coupling portion of the connected link module from the cable accommodating space side by a snap-fit mechanism. The connecting arm is incorporated into the stopper link.

The connected link module, a stopper link, a connecting arm and the like used in the cable or the like protection and guide device according to the present invention are preferably engineering plastic resins such as polyamide 6, polyamide 12, polyamide 46, polyamide 66, acryl, polyacetal and the like. These materials resist flexional strain which is liable to be generated during flexional operation so that excellent dimensional stability of a cable holding form is exhibited. These materials are particularly well suited for this application when they are molded by use of a fatigue resistant resin material in which elastomer or a rubber component is blended to a polyamide resin or a polybuthylene terephthalate resin since the elastomer or the rubber component blended to the polyamide resin or the polybuthylene terephthalate resin adds flexibility, shock resistance and fatigue resistance to repeated flexions.

EXAMPLE 1

A cable or the like protection and guide device 100 in example 1, which is an embodiment of the present invention, will be described with reference to FIGS. 1 to 6.

Figure 1:
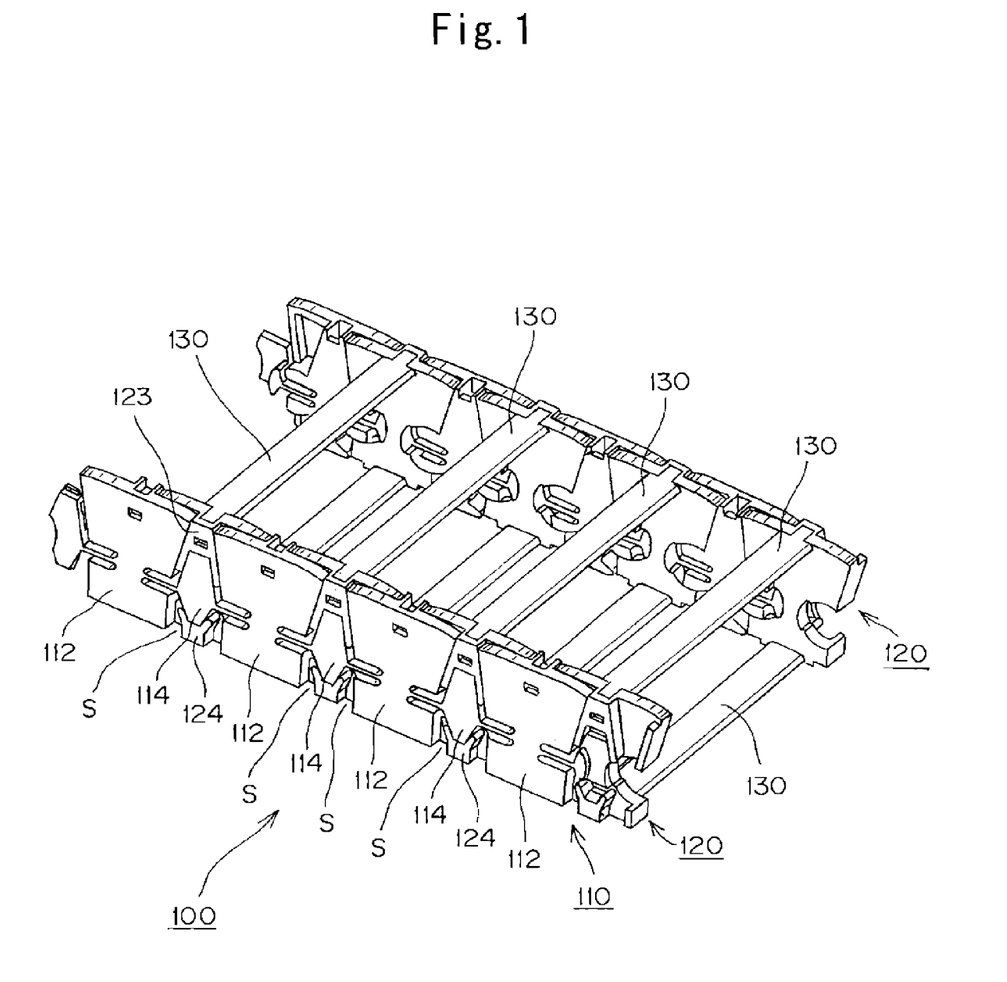
FIG. 1 is a perspective view showing a part of a cable or the like protection and guide device 100, which is example 1.
Figure 2:
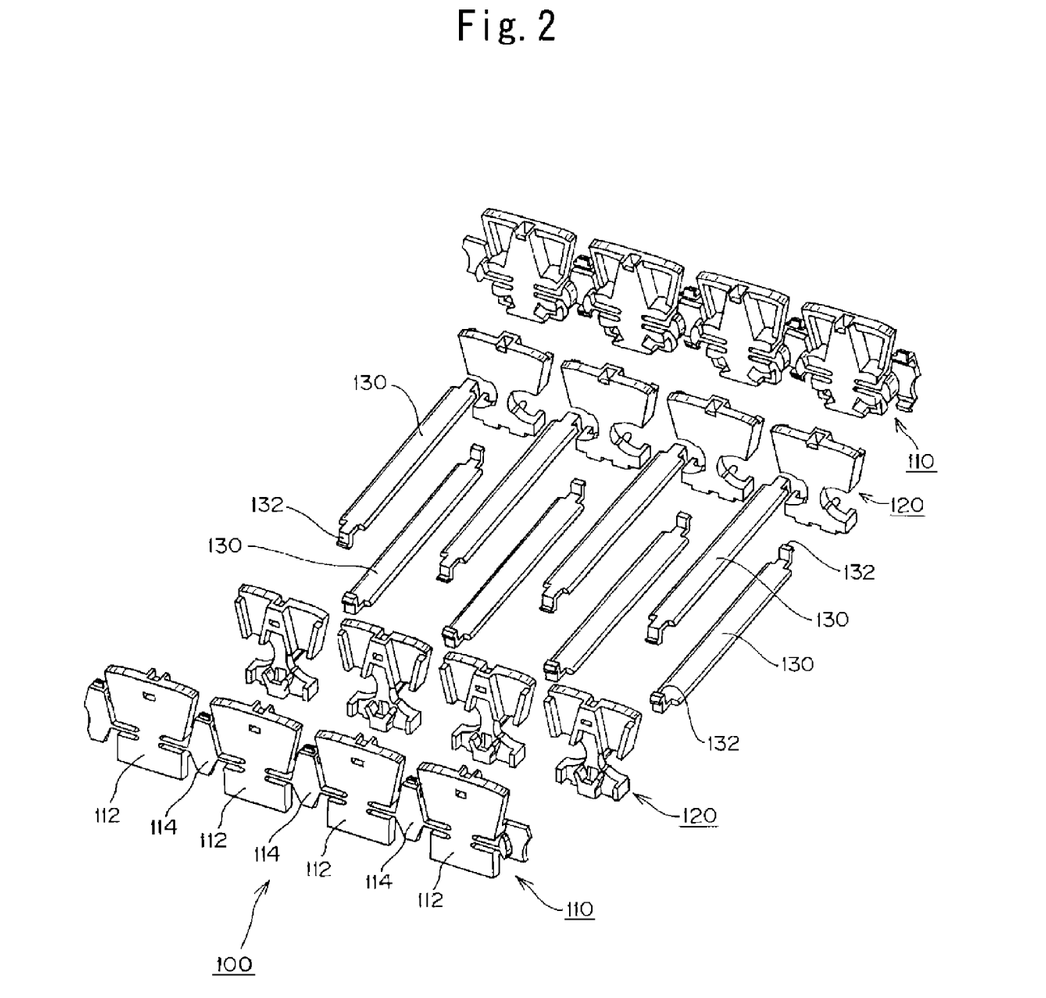
FIG. 2 is an exploded view of the cable or the like protection and guide device 100 shown in FIG. 1.
Figure 3A:
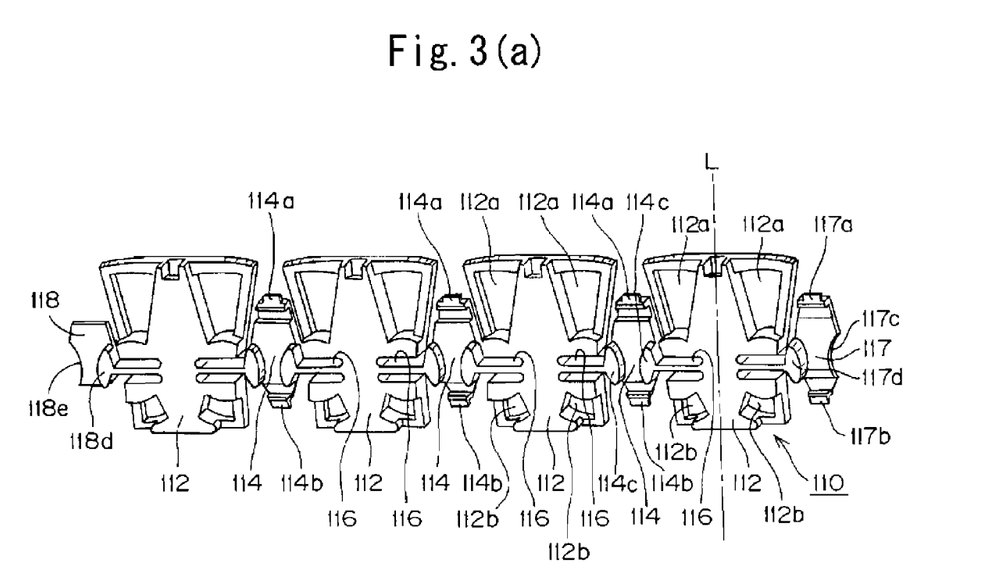
FIG. 3 is a perspective view of a connected link module, which is a component of the cable or the like protection and guide device 100 shown in FIG. 1.
Figure 3B:
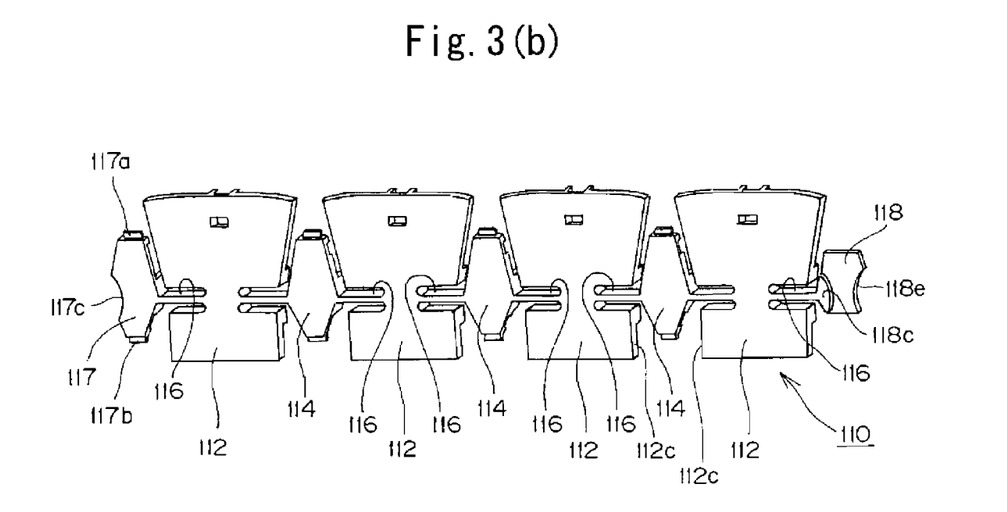
Figure 4A:
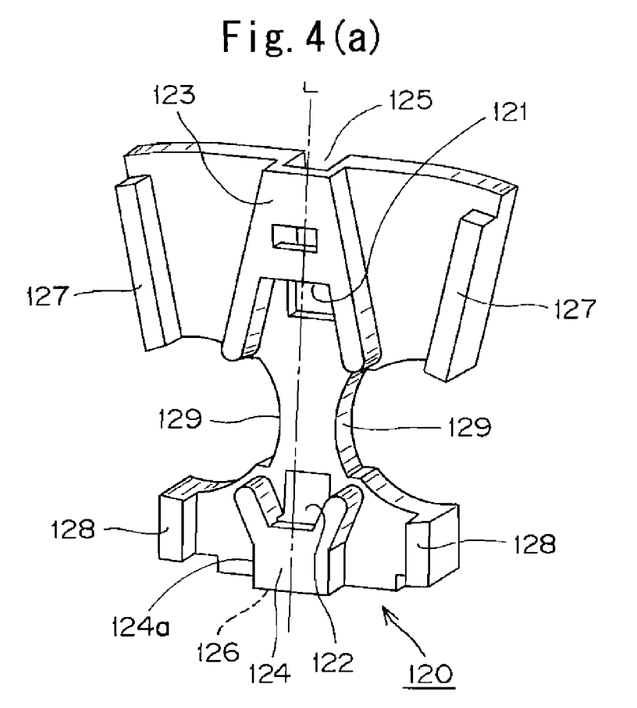
FIG. 4 is a perspective view of a stopper link, which is a component of the cable or the like protection and guide device 100 shown in FIG. 1.
Figure 4B:
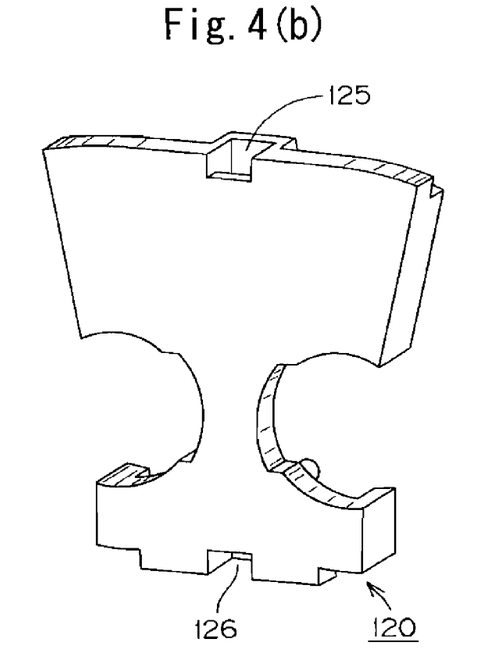

Here, FIG. 1 is a perspective view of example 1 showing a part of a cable or the like protection and guide device 100. FIG. 2 is an exploded view of the cable or the like protection and guide device 100 shown in FIG. 1. FIG. 3 is a perspective view of a connected link module 110, which is a component of the cable or the like protection and guide device 100 shown in FIG. 1, particularly, FIG. 3($a$) is a perspective view viewed from a cable accommodating space side and FIG. 3($b$) is a perspective view viewed from the outside. FIG. 4 is a perspective view of a stopper link which is a component of the cable or the like protection and guide device 100 shown in FIG. 1, particularly FIG. 4($a$) is a perspective view showing a side, that is incorporated to a connected link module and FIG. 4($b$) is a perspective view viewed from a cable accommodating space side.

The cable or the like protection and guide device 100, which is an example of the present invention, is used for protecting and guiding cables or the like such as electric cables, which connect between a movable portion and a stationary portion in a semiconductor device, a pharmacy development sample storage device, a vehicle door opening/closing device, and the like to carry out transmission of electric signals and supply of electric power, and hoses, which supply pressure liquid or pressure gas. The cable or the like protection and guide device longitudinally connects a plurality of cables between the movable portion and the stationary portion. Further the cable or the like protection and guide device 100 exhibits a linear position or a flexed position in accordance with relatively remote movement conditions between the movable portion and the stationary portion.

In the cable or the like protection and guide device 100, which is the present example, as shown in FIGS. 1 to 4, a plurality of side plate portions 112 are integrally molded through coupling portions 114 to form a connected link module 110. The number of the connected side plate portions 112 is not limited. However, since just two or three connected side plate portions does not give an adequate reduction in parts to economize, a connection of four or more side plate portions 112 is preferable. Further, the number of side plate portions 112 may be very large depending on the usage of the device. Many of the connected link modules may be used together in the formation of the cable protection and guide device.

This plurality of side plate portions 112 form an elongated connected link module 110. Coupling arms 116 horizontally extend and connect substantially diamond-shaped coupling portions 114 formed between adjacent side plate portions 112,112 as shown in FIGS. 3($a$) and 3($b$). Further, to connect the connected link modules 110 to each other a connecting hook 117 is formed on an end of the connected link module 110 and a connecting plate 118 is formed on the other end of the connected link module 110.

A stopper link 120 is connected to the coupling portions 114 of the connected link module 110 as shown in FIGS. 4($a$)

and 4(b) by a snap-fit mechanism from a cable accommodating space side so that the flexional angles on the flexional inner circumferential side and the flexional outer circumferential side of the cable or the like protection and guide device 100 are restricted. In this example, the snap-fit mechanism is formed by engaging a convex portion 114a provided on an upper portion of the coupling portion shown in FIG. 3(a) and a concave portion 121 provided on a stopper link 120 shown in FIG. 4(a), and by engaging a convex portion 114b provided on a lower portion of the coupling portion 114 and a concave portion 122 provided on the stopper link 120 shown in FIG. 4(a).

Further, upper side convex portions 127 of the stopper link 120 shown in FIG. 4(a) are accommodated into a back surface of the side plate portion 112 shown in FIG. 3(a), namely, upper engagement regions 112a formed in the upper right and left sides on a cable accommodating space side. The lower side convex portions 128 of the stopper link 120 shown in FIG. 4(a) are accommodated into lower engagement regions 112b formed in the lower right and left sides of a back surface of the side plate portion 112 shown in FIG. 3(a). Further, an arc convex portion 114c formed on a back surface of the coupling portion 114 shown in FIG. 3(a) comes into sliding contact with an arc portion 129 of the stopper link 120.

Further, stopper link 120 shown in FIG. 4(a) includes an integrally molded upper coupling support portion 123 and a lower coupling support portion 124 which intermates with the coupling portion 114 of the connected link module shown in FIGS. 3(a) and (b) on the upper and lower sides respectively. As shown in FIG. 1, the upper coupling portion supporting portion 123 is fitted between adjacent side plate portions 112, 112 and the upper coupling portion 114 resides therebetween. As such, this configuration restricts the cable or the like protection and guide device 100 so that it is not flexed beyond substantially a straight line on the flexional outer circumferential side.

On the other hand, the lower coupling portion supporting portion 124 abuts on a lower portion of the coupling portion 114 formed between adjacent side plate portions 112, 112. Side surfaces 124a of the lower coupling supporting portion 124 shown in FIG. 4(a) and lower side surfaces 112c of adjacent side plate portions 112, 112 shown in FIG. 3(b) form gaps S as shown in FIG. 1. The flexional inner circumferential side flexional angle of the cable or the like protection and guide device is restricted by abutment of the side surface 124a of the lower coupling supporting portion 124 and the lower side surface 112c of the side plate portion 112.

Next, the connecting mechanism of connected link modules 110 will be described. As shown in FIGS. 3(a) and 3(b), at one end portion of the connected link module 110 is formed a connecting hook 117 having a similar shape to that of the coupling portion 114. The end portion of this connecting hook 117 has an arc-shaped cutout portion 117c. An arc-shaped convex portion 117d having the same shape as that formed in the coupling portion 114 is formed on a portion extended from the coupling arm 116 on the cable accommodating space side. At the other end portion of the connected link module 110 a connecting plate 118 is formed. On the outer side surface of connecting plate 118 and in a portion extended from the coupling arm 116 is formed an arc-shaped convex portion 118c having the same shape as that formed in the coupling portion 114. Further, on the surface opposite the arc-shaped convex portion 118c of the connecting plate 118 is formed an arc-shaped convex portion 118d.

Figure 5:
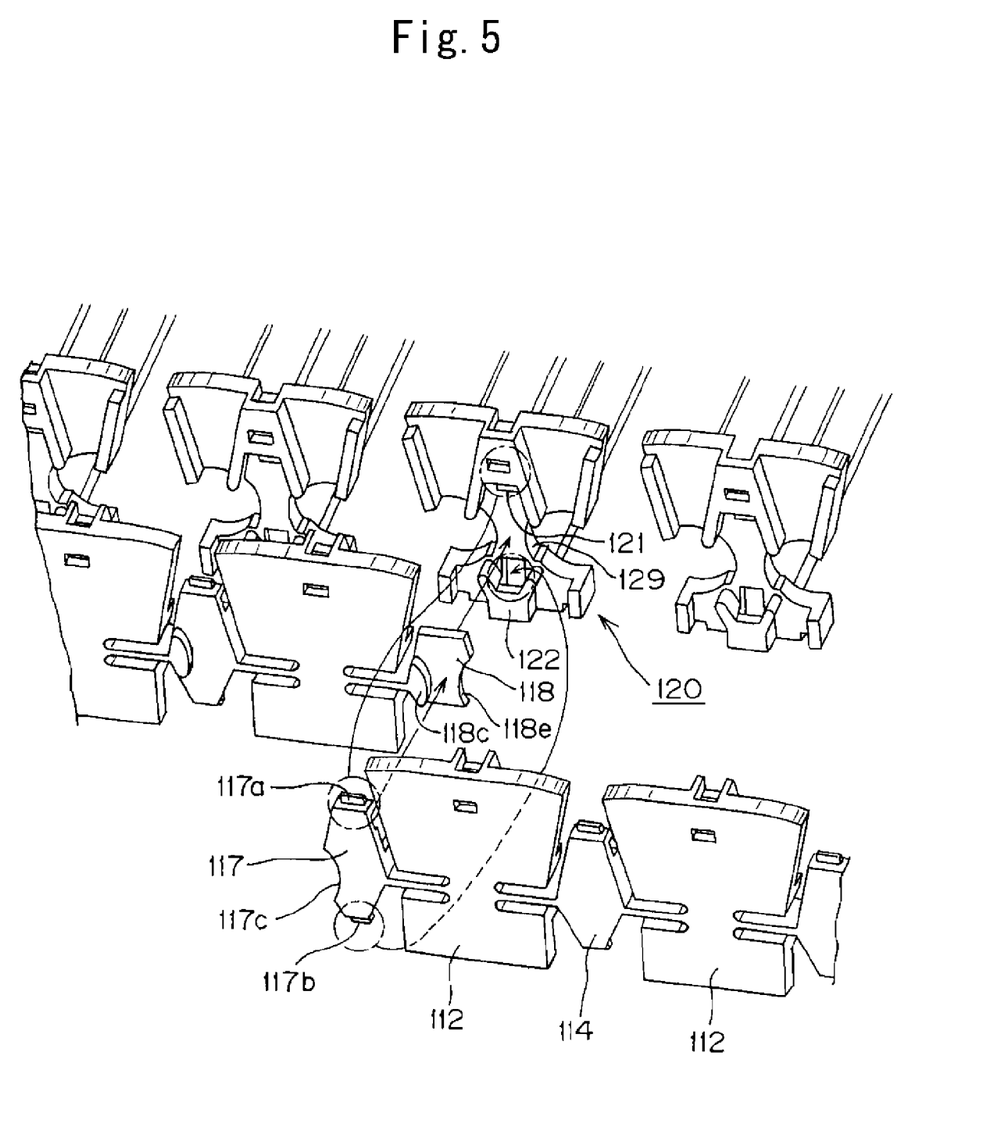
FIG. 5 is a perspective view explaining a connecting mechanism of a connected link module.
Figure 6:
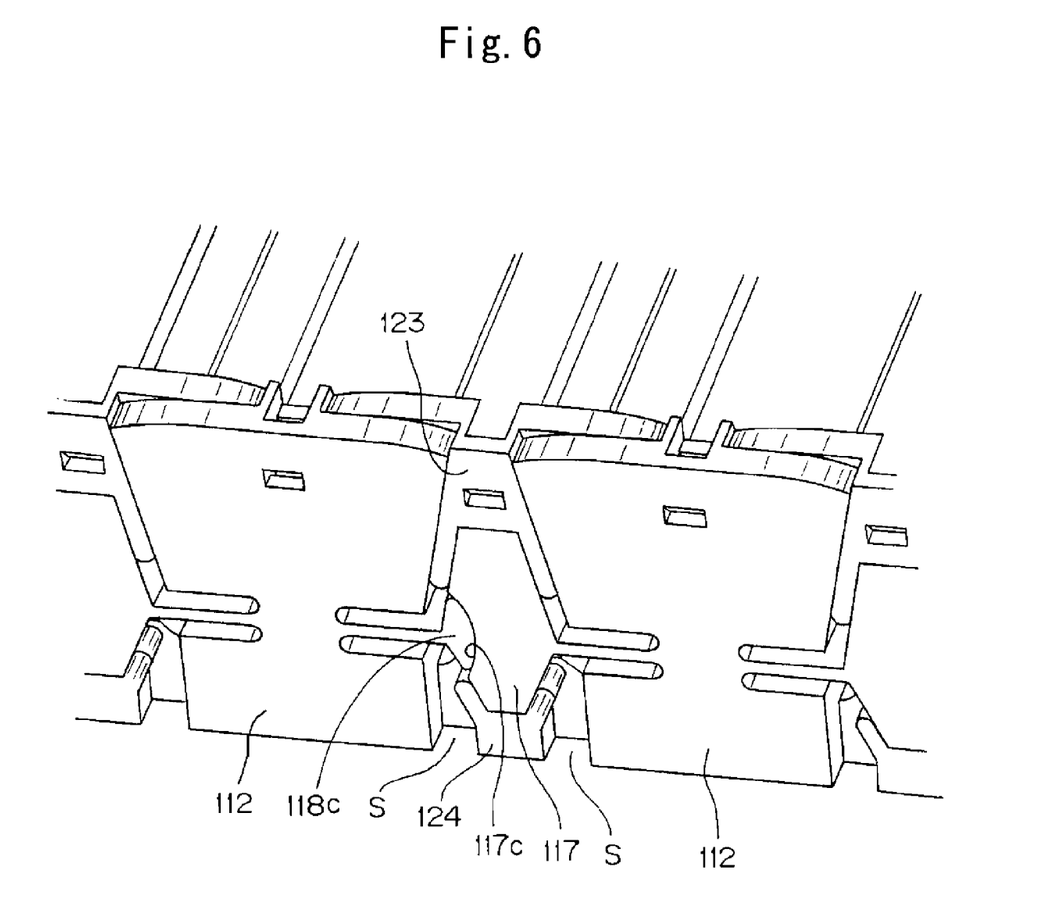
FIG. 6 is an enlarged view of a connected portion when the connected link module is connected.

And when the connecting hook 117 and the connecting plate 118 are joined with each other, a convex portion 117a provided on an upper portion of the connecting hook 117 engages with a concave portion 121 provided on the stopper link 120 in a fitted state. The arc-shaped cutout portion 117c of the connecting hook 117 and the arc-shaped convex portion 118c of the connecting plate 118 are fitted to each other as shown in FIG. 5. A snap-fit mechanism is formed by the engagement between a convex portion 117b provided on a lower portion of the connecting hook 117 and a concave portion 122 provided on the stopper link 120 so that two connected link modules 110 are connected to each other. Then a back surface of the connecting hook 117, that is, an arc-shaped convex portion 117d formed on the cable accommodating space side engages with an arc-shaped cutout portion 118e formed at the outermost side end portion of the connecting plate 118 and an arc portion 129 of the stopper link 120. FIG. 6 is an enlarged view of a connected portion in which two connecting modules 110 are connected to each other.

Further, on both ends of the connecting arm 130 are formed engagement hooks 132 as shown in FIG. 2. Upper and lower portions of the stopper link 120 include engagement concave portions 125 and 126 shown in FIGS. 4(a) and 4(b). Arms 130 include engagement hooks 132 which interengage concave portions 125, 126 thus removably connecting the arms 130 to the upper and lower portions of the stopper links 120.

The side plate portion 112 and the stopper link 120 are symmetrically shaped with respect to the vertical center line L as shown in FIGS. 3(a) and 3(b). Thus a pair of spaced right and left side plate portions 112 and the stopper link 120 each can be used quickly and easily to assemble the cable guide and protection device due to the symmetry of the components.

EXAMPLE 2

A cable or the like protection and guide device 200 of example 2, which is another embodiment of the present invention, will be described below referring to FIGS. 7 and 8.

Figure 7:
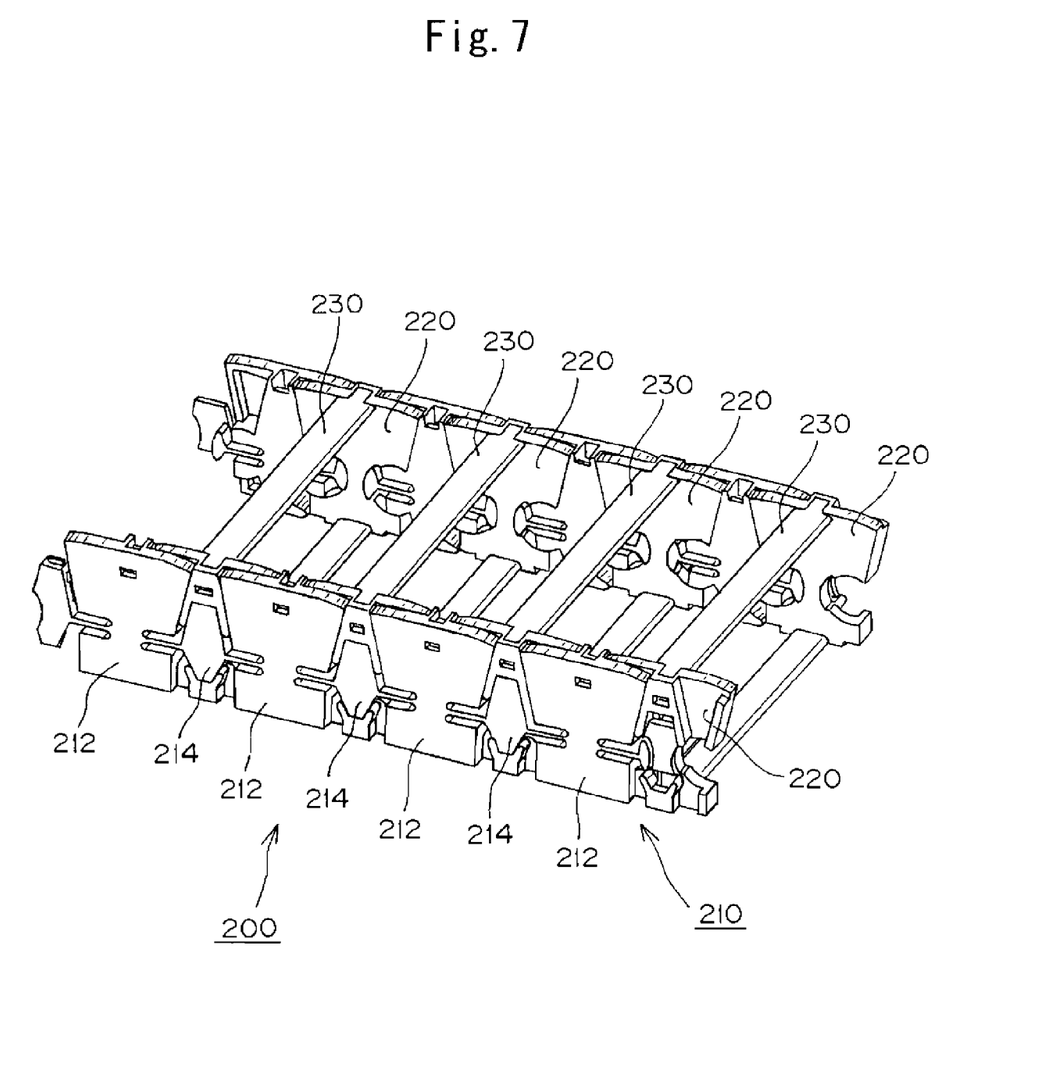
FIG. 7 is a perspective view showing a part of a cable or the like protection and guide device 200, which is example 2.
Figure 8:
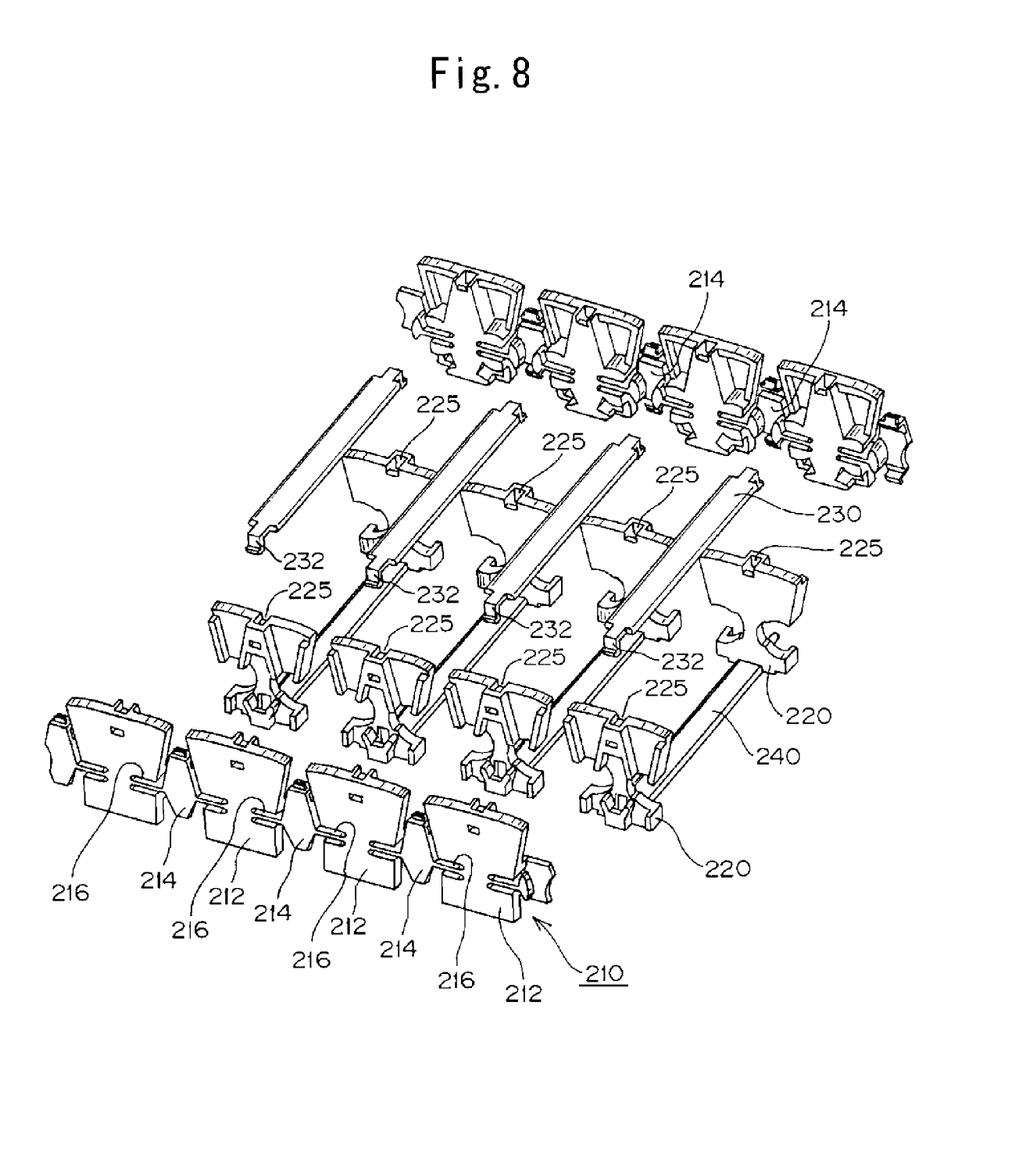
FIG. 8 is an exploded view of the cable or the like protection and guide device 200 shown in FIG. 7.

Here, FIG. 7 is a perspective view showing a part of the cable or the like protection and guide device 200, which is example 2, and FIG. 8 is an exploded view of the cable or the like protection and guide device 200 shown in FIG. 7.

In the cable or the like protection and guide device 200, which is the present example, as shown in FIGS. 7 and 8, a plurality of side plate portions 212 are integrally molded through coupling portions 214 to form a connected link module 210. This plurality of side plate portions 212 form an elongated connected link module 210 using coupling arms 216 horizontally extended to substantially diamond-shaped coupling portions 214 of adjacent side plate portions 212 and 212 as shown in FIG. 8.

Stopper links 220 are connected to link modules 210 as shown in FIG. 8 by a snap-fit mechanism from the cable accommodating space side so that the flexional angles on the flexional inner circumferential side of the cable or the like protection and guide device 200 are restricted.

Further, engagement hooks 232 on both ends of the upper connecting arm 230 are interconnected to engagement concave portions 225 in the upper portions of the stopper links 220 as shown in FIG. 8. And by engagement between the engagement hook 232 and the engagement concave portion 225, the upper connecting arm 230 is removably connected to the stopper link 220. The lower connecting arm 240 is integrally molded with a pair of right and left stopper links 220. Therefore, to manufacture the invention, a reduced number of parts is required and assembly is simplified. As described above, the configurations and functions of the individual elements (parts or members) have been previously described and a detailed description of them is omitted.

EXAMPLE 3

A cable or the like protection and guide device 300 of example 3, which is still another embodiment of the present invention, will be described below by use of FIGS. 9 and 10.

Figure 9:
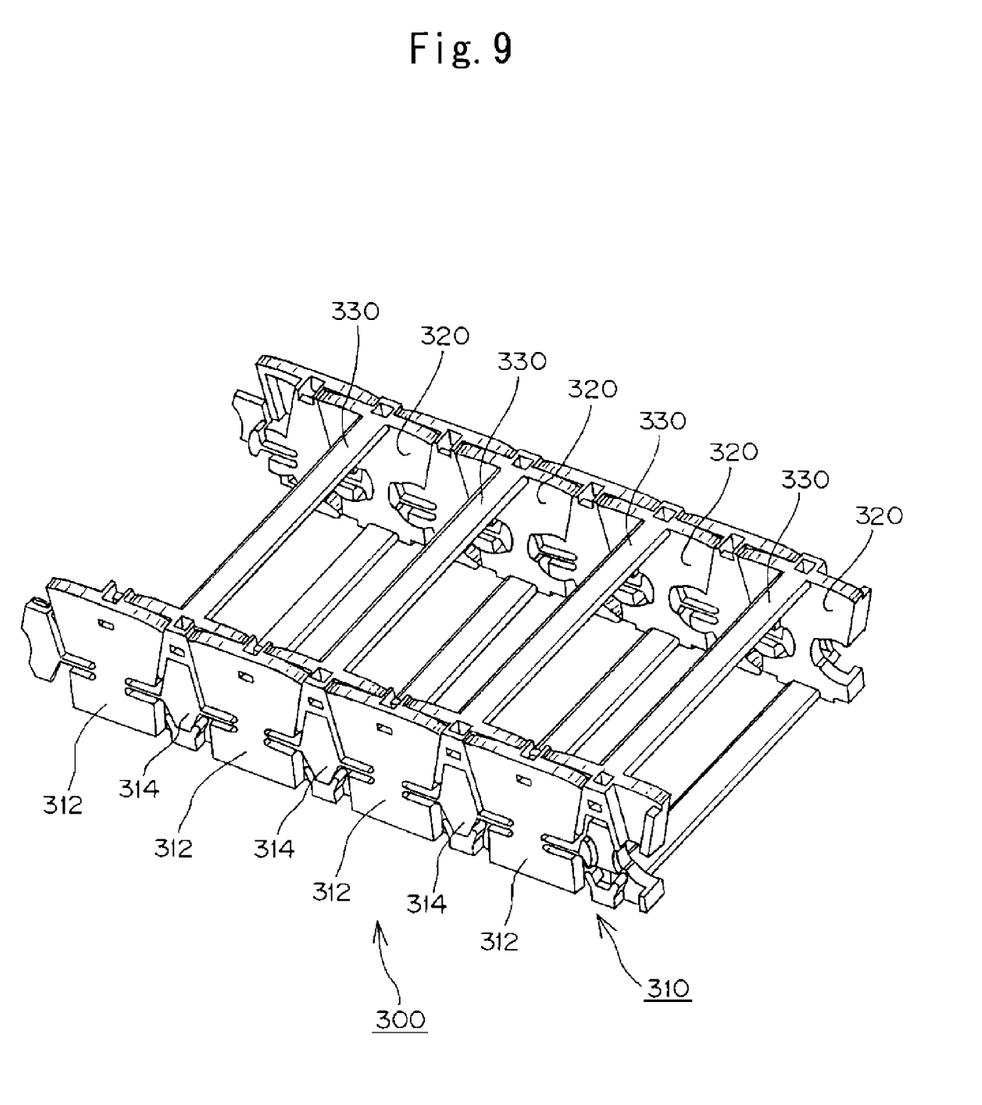
FIG. 9 is a perspective view showing a part of a cable or the like protection and guide device 300, which is example 3.

Here, FIG. 9 is a perspective view showing a part of the cable or the like protection and guide device 300, which is example 3. FIG. 10 is an exploded view of the cable or the like protection and guide device 300 shown in FIG. 9.

Figure 10:
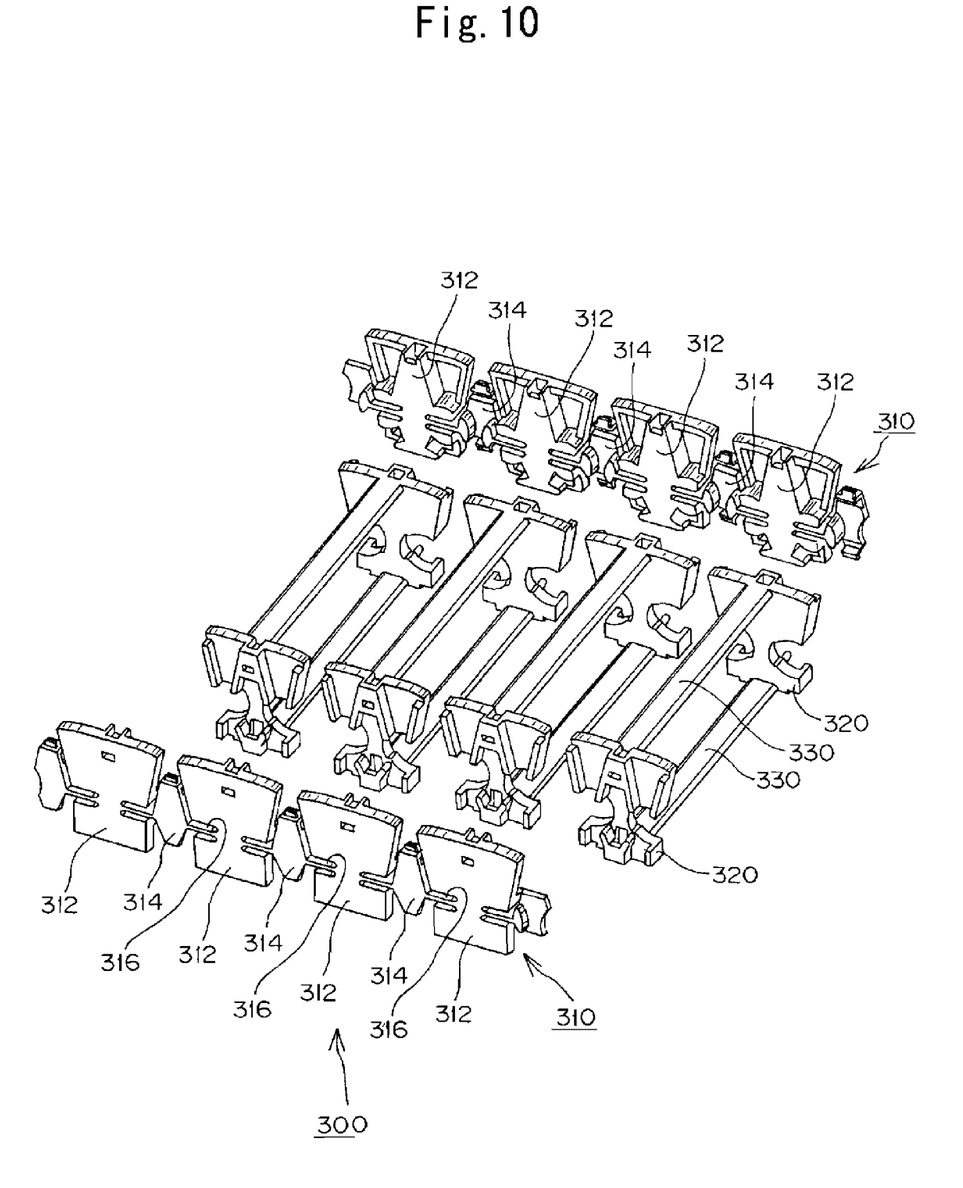
FIG. 10 is an exploded view of the cable or the like protection and guide device 300 shown in FIG. 9.

In the cable or the like protection and guide device 300, which is the present example, as shown in FIGS. 9 and 10, a plurality of side plate portions 312 are integrally molded with coupling portions 314 to form a connected link module 310. The plurality of side plate portions 312 form an elongated connected link module 310 using coupling arms 316 horizontally extended and interconnecting substantially diamond-shaped coupling portions 314 of adjacent side plate portions 312, 312 as shown in FIG. 10.

A stopper link 320 interconnects with coupling portions 314 using a snap-fit mechanism from the cable accommodating space of the connected link module 310 so that the flexional angles on the flexional inner circumferential side of the cable or the like protection and guide device 300 are restricted.

Further, as shown in FIG. 10, upper and lower connecting arms 330 are integrally molded with a pair of right and left stopper links 320. This configuration further reduces the number of parts and further reduces the number of parts necessary for the manufacture of the device and further reduces the required assembly. As described above, the configurations and functions of the individual elements or members are the same as in example 1 except that the upper and lower connecting arms 330 are integrally molded with the pair of right and left stopper links 320. Thus a detailed description is omitted.

DESCRIPTION OF REFERENCE NUMERALS

100, 200, 300 . . . Cable or the like protection and guide device
110, 210, 310 . . . Connected link module
112, 212, 312 . . . Side plate portion
112a . . . Upper engagement region (of side plate portion)
112b . . . Lower engagement region (of side plate portion)
114, 214, 314 . . . Coupling portion
114a, 114b . . . Convex portion (Snap-fit mechanism)
114c . . . Arc-shaped convex portion (of coupling portion)
116, 216, 316 . . . Coupling arm
117 . . . Connecting hook
117a, 117b . . . Convex portion
117c . . . Arc-shaped cutout portion (of connecting hook)
117d . . . Arc-shaped convex portion (of connecting hook)
118 . . . Connecting plate
118c, 118d . . . Arc-shaped convex portion (of connecting plate)
120, 220, 320 . . . Stopper link
121, 122 . . . Concave portion (Snap-fit mechanism)
123 . . . Coupling portion upper supporting portion
124 . . . Coupling portion lower supporting portion
125, 126 . . . Engagement concave portion
127 . . . Upper side convex portion (of stopper link)
12 . . . Lower side convex portion (of stopper link)
129 . . . Arc portion (of stopper link)
130, 230, 240, 330 . . . Connecting arm
132, 232 . . . Engagement hook Those skilled in the art will readily recognize that the foregoing invention has been described by way of example only. Accordingly, the examples may be modified without departing from the spirit and the scope of the appended claims.

The invention claimed is:

1. A cable protection and guide device, comprising:
   a plurality of pairs of right and left spaced side plates articulately connected to each other in a longitudinal direction from a mounting fixed end to a mounting movable end enabling said side plates to form a flexional circumferential bend having a flexional inner circumferential side and flexional outer circumferential side;
   each of said side plates includes a flexional inner circumferential side residing during bending on said flexional inner circumferential side of said bend;
   each of said side plates includes an outer circumferential side residing during bending on said outer flexional circumferential side of said bend;
   connecting arms are respectively bridged over a flexional inner circumferential side and a flexional outer circumferential side of said side plate portions at predetermined intervals;
   a cable accommodating space surrounded by said side plate portions and said connecting arms extending from said mounting fixed end toward said mounting movable end;
   a cable is accommodated in said cable accommodating space;
   said plurality of side plate portions are integrally molded to form a connected link module;
   said integrally molded connected link modules include coupling portions interconnecting said side plate portions;
   said cable protection and guide device includes stopper links;
   said coupling portions and said stopper links include a snap-fit mechanism;
   said snap-fit mechanism interengaging said said stopper links and said respective coupling portion of said connected link module from said cable accommodating space side; and,
   each of said connecting arms is affixed to said stopper link.

2. A cable protection and guide device according to claim 1, characterized in that said side plate portion has a symmetrical shape.

3. A cable protection and guide device according to claim 1, characterized in that said stopper link has a symmetrical shape.

4. A cable protection and guide device according to claim 2, characterized in that said stopper link has a symmetrical shape.

5. A cable protection and guide device as claimed in claim 1 wherein said inner and outer circumferential connecting arms are integrally molded with said stopper links.

6. A cable protection and guide device as claimed in claim 1 wherein said inner circumferential connecting arm is integrally molded with said stopper links.

* * * * *

UNITED STATES PATENT AND TRADEMARK OFFICE
CERTIFICATE OF CORRECTION

| | | |
|---|---|---|
| PATENT NO. | : 7,513,097 B2 | Page 1 of 1 |
| APPLICATION NO. | : 11/946131 | |
| DATED | : April 7, 2009 | |
| INVENTOR(S) | : Utaki et al. | |

It is certified that error appears in the above-identified patent and that said Letters Patent is hereby corrected as shown below:

Col. 1, line 18, after "FIG." delete "1" and insert --11--.

Col. 2, line 4, after "side" delete "is".

Signed and Sealed this

Twenty-sixth Day of May, 2009

JOHN DOLL
*Acting Director of the United States Patent and Trademark Office*